(12) United States Patent
Miller et al.

(10) Patent No.: US 9,522,681 B2
(45) Date of Patent: Dec. 20, 2016

(54) SYSTEM AND METHOD FOR RESTRICTING AUDIO TRANSMISSION BASED ON DRIVER STATUS

(75) Inventors: Thomas Lee Miller, Ann Arbor, MI (US); Robert Earl Johnson, Jr., Northville, MI (US); Kenneth Nkosi Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1325 days.

(21) Appl. No.: 12/536,202

(22) Filed: Aug. 5, 2009

(65) Prior Publication Data

US 2011/0032102 A1 Feb. 10, 2011

(51) Int. Cl.
| | | |
|---|---|---|
| G08B 23/00 | (2006.01) | |
| B60W 50/08 | (2012.01) | |
| B60Q 1/00 | (2006.01) | |
| G05B 19/00 | (2006.01) | |
| G08G 1/123 | (2006.01) | |
| B60R 22/00 | (2006.01) | |

(52) U.S. Cl.
CPC ........ *B60W 50/085* (2013.01); *B60W 2540/28* (2013.01)

(58) Field of Classification Search
USPC ............................................ 340/573.1, 5.74
See application file for complete search history.

(56) References Cited

U.S. PATENT DOCUMENTS

| 6,950,638 | B2 | 9/2005 | Videtich et al. |
| 7,075,409 | B2 | 7/2006 | Guba |
| 7,802,278 | B2 | 9/2010 | Kweon |
| 2004/0046452 | A1 | 3/2004 | Suyama et al. |
| 2004/0135670 | A1* | 7/2004 | Guba ..................... B60R 25/24 340/5.21 |
| 2004/0139047 | A1 | 7/2004 | Rechsteiner et al. |
| 2004/0205334 | A1* | 10/2004 | Rennels ....................... 713/154 |
| 2006/0136106 | A1 | 6/2006 | Patenaude et al. |
| 2007/0001828 | A1* | 1/2007 | Martinez .................. 340/426.25 |
| 2007/0112492 | A1* | 5/2007 | Hyodo et al. .................... 701/49 |
| 2007/0126604 | A1* | 6/2007 | Thacher ................... 340/995.13 |
| 2007/0150918 | A1* | 6/2007 | Carpenter et al. .............. 725/25 |
| 2008/0032647 | A1* | 2/2008 | Buchheim .............. H04H 20/02 455/132 |
| 2008/0275604 | A1 | 11/2008 | Perry et al. |

(Continued)

FOREIGN PATENT DOCUMENTS

| CN | 1495074 A | 5/2004 |
| GB | 2273580 A | 6/1994 |

OTHER PUBLICATIONS

Chinese Office Action for corresponding Application No. 201010244998.1, mailed Dec. 9, 2013, 8 pages.

*Primary Examiner* — Jack K Wang
(74) *Attorney, Agent, or Firm* — Brooks Kushman P.C.; Jennifer M. Stec

(57) ABSTRACT

In at least one embodiment, a method and a apparatus for restricting audio transmission in a vehicle is provided. The apparatus comprises a control module. The control module is configured to receive an audio feed signal including audio content and a content advisory indicator and compare the content advisory indicator to predetermined criteria. The control module is further configured to restrict transmission of the audio data based on the comparison of the content advisory indicator to the predetermined criteria.

19 Claims, 5 Drawing Sheets

(56) References Cited

U.S. PATENT DOCUMENTS

2009/0193207 A1     7/2009   Ogata et al.
2010/0076642 A1*   3/2010   Hoffberg et al. ............... 701/29
2010/0087987 A1*   4/2010   Huang et al. .................. 701/36

* cited by examiner

SYSTEM AND METHOD FOR RESTRICTING AUDIO TRANSMISSION BASED ON DRIVER STATUS

BACKGROUND

1. Technical Field

The embodiments of the present invention generally relate to a system and method for restricting audio transmission based on driver status.

2. Background Art

With conventional automotive vehicles, one or more keys are often shared between any number of drivers (e.g., parent/teen, employer/employee, owner/valet driver, or fleet vehicle owner/fleet vehicle driver). In one example, the parents of a teenager (or young adult) that is old enough to drive may provide the keys of the vehicle to the teenager. The vehicle may be equipped with various safety and/or driver notification features that may be enabled/disabled via a user interface based on the driver's needs. However, in some circumstances, the parent may not intend to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other primary drivers, the option of preventing teenagers that are eligible to drive or other such secondary drivers from disabling safety and notification features.

It is known that drivers can subscribe to various audio plans (e.g., satellite audio providers such as Sirius® or other suitable providers) so that drivers can access a multitude of channels than those typically offered by frequency modulation (FM) or amplitude modulation (AM) audio systems in the vehicle. In general, the Federal Communications Commission (FCC) regulates the content (i.e., subject matter) that is communicated over FM or AM based channels. However, for satellite audio, there may not be any type of regulation for adult based content. In some cases, the primary driver may deem such adult based content as unsuitable for the secondary driver.

SUMMARY

In at least one embodiment, a method and a apparatus for restricting audio transmission in a vehicle is provided. The apparatus comprises a control module. The control module is configured to receive an audio feed signal including audio content and a content advisory indicator and compare the content advisory indicator to predetermined criteria. The control module is further configured to restrict transmission of the audio data based on the comparison of the content advisory indicator to the predetermined criteria.

DETAILED DESCRIPTION

The embodiments of the present invention generally provide for a driver identification functional operation whereby primary and secondary drivers are determined and various levels of control are granted to the driver based on whether the driver is the primary driver or the secondary driver. In general, the primary driver (e.g., a parent, employer, consumer of valet services, fleet vehicle owner) may be defined as the administrative driver who has greater control over the functionality of the various features (e.g., safety features and/or safety notification features) in the vehicle. For example, the primary driver may enable or disable the various features in the vehicle. The secondary driver may be defined as a restricted driver who has limited control over features generally provided by the vehicle and is to abide by the functional restrictions imposed or selected by the vehicle or the primary driver. For example, the primary driver may enable the features for the secondary driver, and the secondary driver is not capable of disabling such features when enabled by the primary driver.

The embodiments of the present invention generally provide, among other things, for a system and method for restricting audio transmission based on driver status. For example, electrical device(s) in the vehicle may determine driver status (e.g., whether the driver is the primary driver or the secondary driver) and prevent the transmission of adult based content when the driver of the vehicle is detected to be the secondary driver.

The embodiments of the present invention as set forth in FIGS. 1-5 generally illustrate and describe a plurality of controllers (or modules/devices), or other electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired in the vehicle. It is generally recognized that each controller and/or module/device disclosed herein may include, but not limited to, any number of microprocessors, ASICs, ICs, memory devices (e.g., FLASH, RAM, ROM, EPROM, EEPROM, or other suitable variants thereof), firmware, and software which co-act with one another to perform the various functions set forth below.

Figure 1:
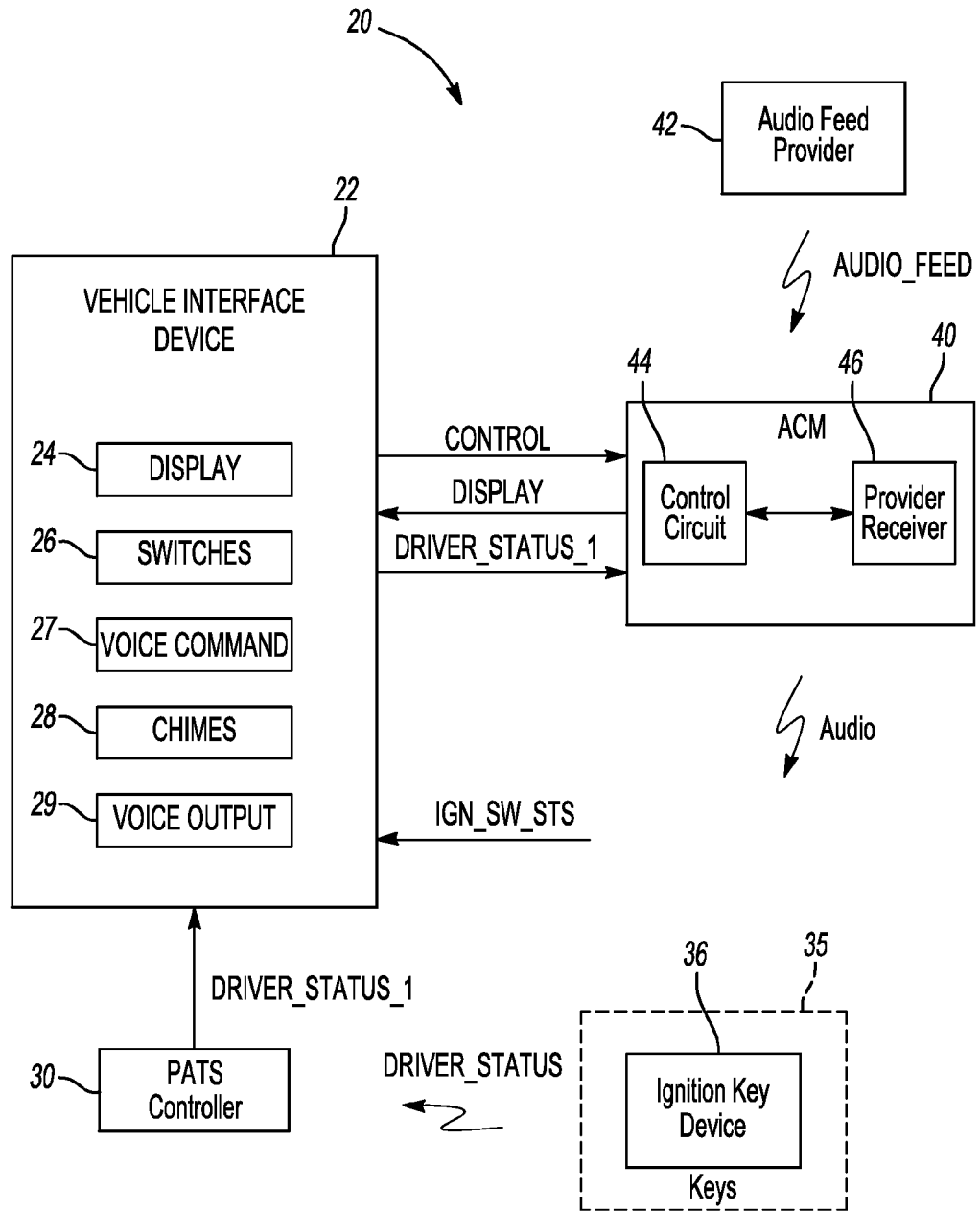
FIG. 1 depicts a system for differentiating between primary and secondary drivers of a vehicle and for restricting audio transmission based on driver status in accordance to one embodiment of the present invention.

FIG. 1 depicts a system 20 for differentiating between primary and secondary drivers of a vehicle and for restricting audio transmission based on the status of the driver in accordance to one embodiment of the present invention. The system 20 generally comprises a vehicle interface device 22. The device 22 includes a display 24 that provides information related to the various states of vehicle functionality to the driver. For example, the display 24 may provide, but not limited to, a driver identification message during vehicle startup, various administrative menu options, a seatbelt warning message, a speed limit start up message, vehicle near top speed message, top speed message, driver identification speed warnings, and/or an inhibit ESC and FCW message. The display 24 may also provide audio information such, as but not limited to, channel #, title, artist, genre, content advisory information, etc.). Such audio information is generally provided by the audio feed provider 42 and broadcast on the signal AUDIO_FEED along with audio data.

The device 22 also includes a plurality of switches 26, a voice recognition command interface 27, chimes 28, and voice output capability 29. The driver may toggle the switches 26 to view different messages and/or select various options. The voice recognition command interface 27 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System", filed Dec. 31, 2003.

The chimes 28 may audibly notify the driver when predetermined vehicle conditions have been met. In one example, the device 22 may activate the chimes 28 when the vehicle is near a top speed, the vehicle has achieved a top speed, the vehicle has exceeded the top speed, there is a low level of fuel in the fuel tank, and/or when the traction control is enabled. In one example, the voice output capability 29 enables the device 22 to transmit audio signals to the driver in the manner, but not limited to, that described in the '440 publication. While the display 24, the switches 26, the voice input command interface 27, chimes 28, and the voice output capability 29 are shown within the device 22, it is contemplated that one or more of these mechanisms may be positioned exterior to the device 22.

A passive anti-theft security (PATS) controller 30 is operably coupled to the device 22. While FIG. 1 generally illustrates that the PATS controller 30 is positioned outside of the device 22, other implementations may include the PATS controller 30 being implemented directly within the device 22. In general, one or more of the signals transmitted to/from the device 22 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 35. The device 22 may receive a signal IGN_SW_STS from a body controller (not shown) to determine the position of the ignition switch. The keys 35 may be tagged or associated with the primary driver or the secondary driver of the vehicle. The key 35 includes an ignition key device 36 embedded therein for communicating with the vehicle. The ignition key device 36 may be in the form of a transponder (not shown) that includes an integrated circuit and an antenna. The transponder is adapted to transmit an electronic code as a signal DRIVER_STATUS to a receiver (not shown) in the PATS controller 30. The signal DRIVER_STATUS may be indicative of which driver (e.g., primary or secondary) is driving the vehicle. The signal DRIVER_STATUS may be in the form of a radio frequency (RF) based signal or a radio frequency identification (RFID) tag that corresponds to binary data. The PATS controller 30 determines if the RF based data in the signal DRIVER_STATUS matches predetermined data stored therein (e.g., in a look up table of the PATS controller 30) prior to allowing the vehicle to start for anti-theft purposes. In the event the RF based data matches the predetermined data, a powertrain control module (or engine controller) (not shown) operably coupled to the PATS controller 30 enables the engine to start. In general, the vehicle assembly plant, supplier facility (e.g., manufacturer of the keys and/or PATS controller 30), car dealership, or vehicle owner performs the operation of learning the data transmitted by the keys 35. The PATS controller 30 may also use the data on the signal DRIVER_STATUS for purposes of identifying whether the driver of the vehicle is the primary driver or the secondary driver.

The PATS controller 30 may transmit a signal DRIVER_STATUS_1 to indicate whether the driver is the primary driver or the secondary driver. Prior to the PATS controller 30 transmitting the signal DRIVER_STATUS_1, the the keys 35 need to be programmed as a primary key or as a secondary key. The manner in which the keys 35 are designated as either a primary key or a secondary key is set forth in one or more of the following U.S. Patent Ser. No.: 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; Ser. No. 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and PCT/US2009/048261, entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Jun. 23, 2009, all of which are hereby incorporated by reference in their entirety.

An audio control module (ACM) 40 is operably coupled to the device 22. The ACM 40 is configured to transmit audio signals to the occupants of the vehicle. The ACM 40 is operably coupled to an audio feed provider 42 for receiving satellite radio/audio signals. In another example, the ACM 40 may be used for an internet radio application. The audio feed provider 42 may be in the form of a digital audio provider such as, but not limited to, Sirius® or other suitable digital radio provider that uses at least one satellite to transmit the signal AUDIO_FEED to the vehicle. As is known, satellite radio provides a digital radio signal that is broadcast by the at least one communication satellite. Satellite radio generally covers a much wider range than terrestrial radio signals. The ACM 40 includes a control circuit 44 and a provider receiver 46. The control circuit 44 and the provider receiver 46 are operably coupled together and are capable of transmitting digital data therebetween. The audio feed provider 42 may provide the audio signals to the vehicle as proprietary signals. The provider receiver 46 receives and decodes the proprietary signals to enable audio playback. In one example, the provider receiver 46 may be implemented as a Sirius® chip set.

The ACM 40 may be tuned to one or more channels (by the driver or occupant) to receive the signal AUDIO_FEED from the audio feed provider 42 based on the selected channel in the ACM 40. The ACM 40 transmits the selected audio signal to the driver (or other occupants) in the vehicle. Various types of news, weather, sports, and music channels may be offered via the provider 42 and accessed by one or more channels selected at the ACM 40.

The ACM 40 transmits a signal DISPLAY to the device 22 so that the device 22 displays, among other things, the audio information provided by the provider 42 that includes, but not limited to, channel number, title, artist, genre, etc. The device 22 may audibly and/or visually transmit content on the signal DISPLAY to the driver/occupants.

In some cases, the primary driver may find that the audio provided by the audio feed provider 42 may include adult content that is not suitable for the secondary driver. The primary driver is capable of programming the device 22 to transmit a signal CONTROL that enables the ACM 40 to prevent various adult based channels from being viewed and/or selected by the secondary driver. For example, the device 22 may receive the signal DRIVER_STATUS from the PATS controller 30 that indicates that the driver of the vehicle is the primary driver. The primary driver may select various user interfaces (e.g., the display 24 (selectable fields on the display 24), the switches 26, or voice command 27) on the device 22 to prevent the secondary driver from selecting channels via the ACM 40 that generally enable the transmission of adult based content. In response to primary locking out adult based channels, the device 22 transmits the signal CONTROL to the ACM 40 so that the ACM 40 restricts (or prevents) audio data associated with the adult based channels for the secondary driver (when detected to be the driver of the vehicle via the signal DRIVER_STATUS). In one example, the ACM 40 may allow the secondary driver to select the adult based channels while preventing the transmission of the audio data. In another example, the ACM 40 may not allow the secondary driver to select the adult based channel (e.g., the ACM 40 may not present the adult based channel to the secondary driver for selection).

Figure 2:
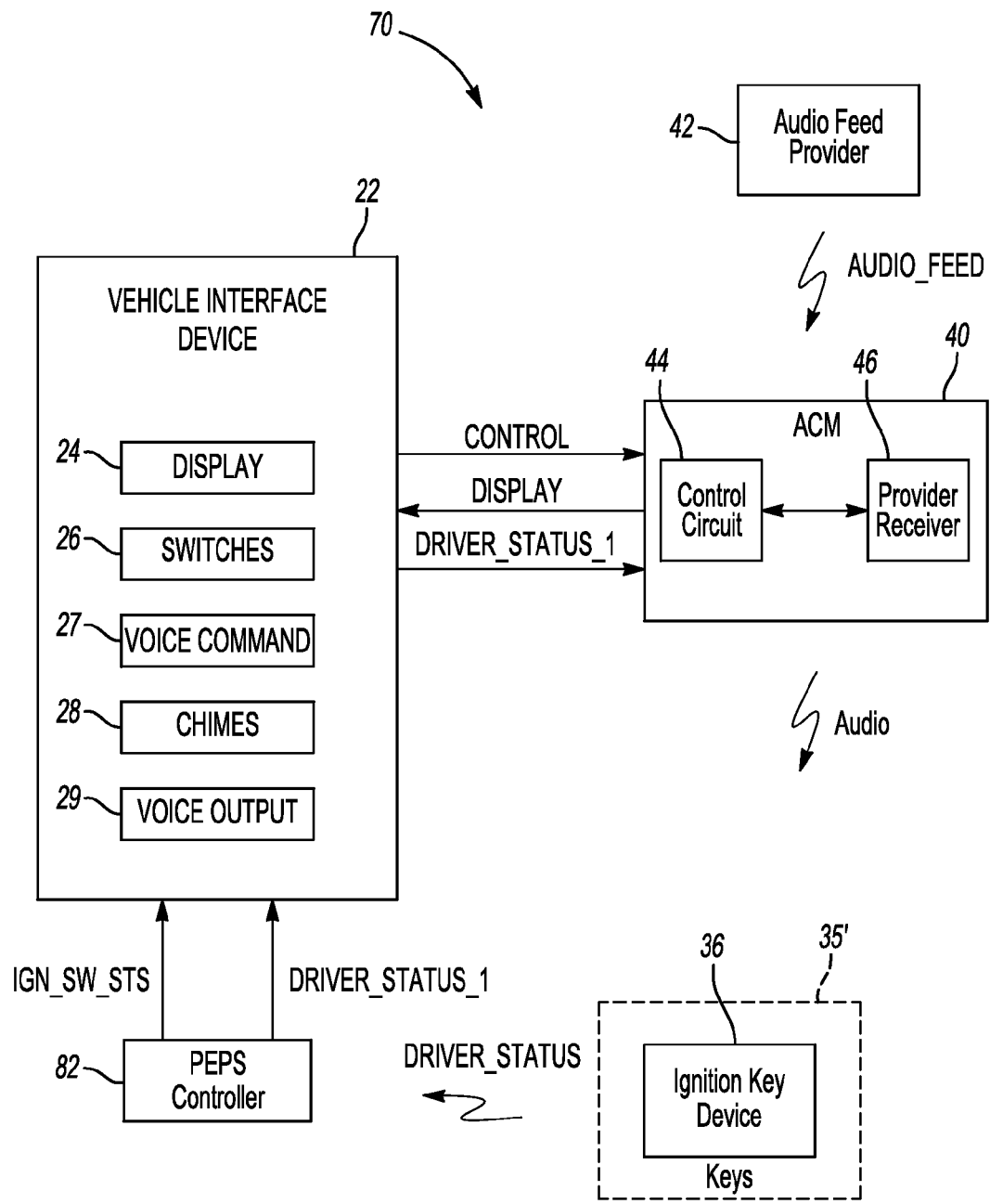
FIG. 2 depicts another system for differentiating between primary and secondary drivers of a vehicle and for restricting audio transmission based on the status of the driver in accordance to one embodiment of the present invention.

FIG. 2 depicts another system 70 for differentiating between primary and secondary drivers of a vehicle and for restricting the transmission of audio data in accordance to one embodiment of the present invention. The system 70 implements a passive entry passive start function to gain entry into and to start the vehicle as opposed to the PATS system that is used for the system 20 for starting the vehicle. A passive entry passive start (PEPS) controller 82 may be operably coupled to the device 22. While FIG. 2 generally illustrates that the PEPS controller 82 is positioned external to the device 22, additional implementations may include positioning the PEPS controller 82 within the device 22. The particular placement of the PEPS controller 82 with respect to the device 22 may vary based on the desired criteria of a particular implementation.

In general, the PEPS function is a keyless access and start system. The driver may carry one or more keys 35' that may be in the form of an electronic transmission device. The keys 35' each include the ignition key device 36 embedded within for communicating with the PEPS controller 82. The transponder of the ignition key device 36 is adapted to send the electronic code as the signal DRIVER_STATUS to the PEPS controller 82. To gain access or entry into the vehicle with the keys 35' in the PEPS implementation, the driver may need to wake up the PEPS controller 82 to establish bi-directional communication between the keys 35' and the PEPS controller 82. In one example, such a wake up may occur by requiring the driver to touch and/or pull the door handle (not shown) of the vehicle. In response to the door handle being toggled or touched, the PEPS controller 82 may wake up and transmit RF based signals to the keys 35'. The PEPS controller 82 and the keys 35' may undergo a series of communications back and forth with each other (e.g., handshaking) for vehicle access authentication purposes. The PEPS controller 82 may unlock the doors in response to a successful completion of the handshaking process. Once the driver is in the vehicle, the driver may simply press a button (not shown) positioned on an instrument panel to start the vehicle.

In one example, the system 70 may be adapted to tag or associate the keys as either a primary or a secondary key during a learn operation as discussed with the PATS controller 30. In yet another example, the system 70 may be configured to associate the keys 35' as primary or secondary keys in the manner identified and disclosed in one or more of the following U.S. Patent Ser. No. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; Ser. No. 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and PCT/US2009/048261 entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Jun. 23, 2009. The PEPS controller 82 may determine the driver status based on the information indicated on the signal DRIVER_STATUS as noted in connection with the system 20 of FIG. 1.

The PEPS controller 82 is adapted to provide the signal DRIVER_STATUS_1 to the various controllers over the communication bus. The signal DRIVER_STATUS_1 corresponds to whether the driver is the primary driver or the secondary driver. The PEPS controller 82 may also transmit the signal IGN_SW_STS to the device 22. The PEPS controller 82 determines that the key ignition status is in the run position in response to the driver toggling the brake pedal (not shown) and depressing the start switch. In such a case, the vehicle is started and the PEPS controller 82 transmits the signal IGN_SW_STS as being in the run state. In the event the driver selects only the start button, the PEPS controller 82 transmits the signal IGN_SW_STS as being in the accessory state.

While FIGS. 1-2 generally disclose keys 35 and 35' that are used in connection with the PATS and PEPS implementations, respectively, it is generally contemplated that the keys may be implemented as a cell phone or other suitable switch device used to authenticate the driver to the vehicle for enabling entry into the vehicle or for starting the vehicle. Data transmitted from the cell phone may be received by a receiver (not shown) on the vehicle and decoded to perform driver authentication for gaining entry into the vehicle, starting the vehicle, and ascertaining driver status.

The system 70 operates in a similar manner to the system 20 with respect to the ACM 42 restricting the transmission of adult based audio data for the secondary driver.

Figure 3:
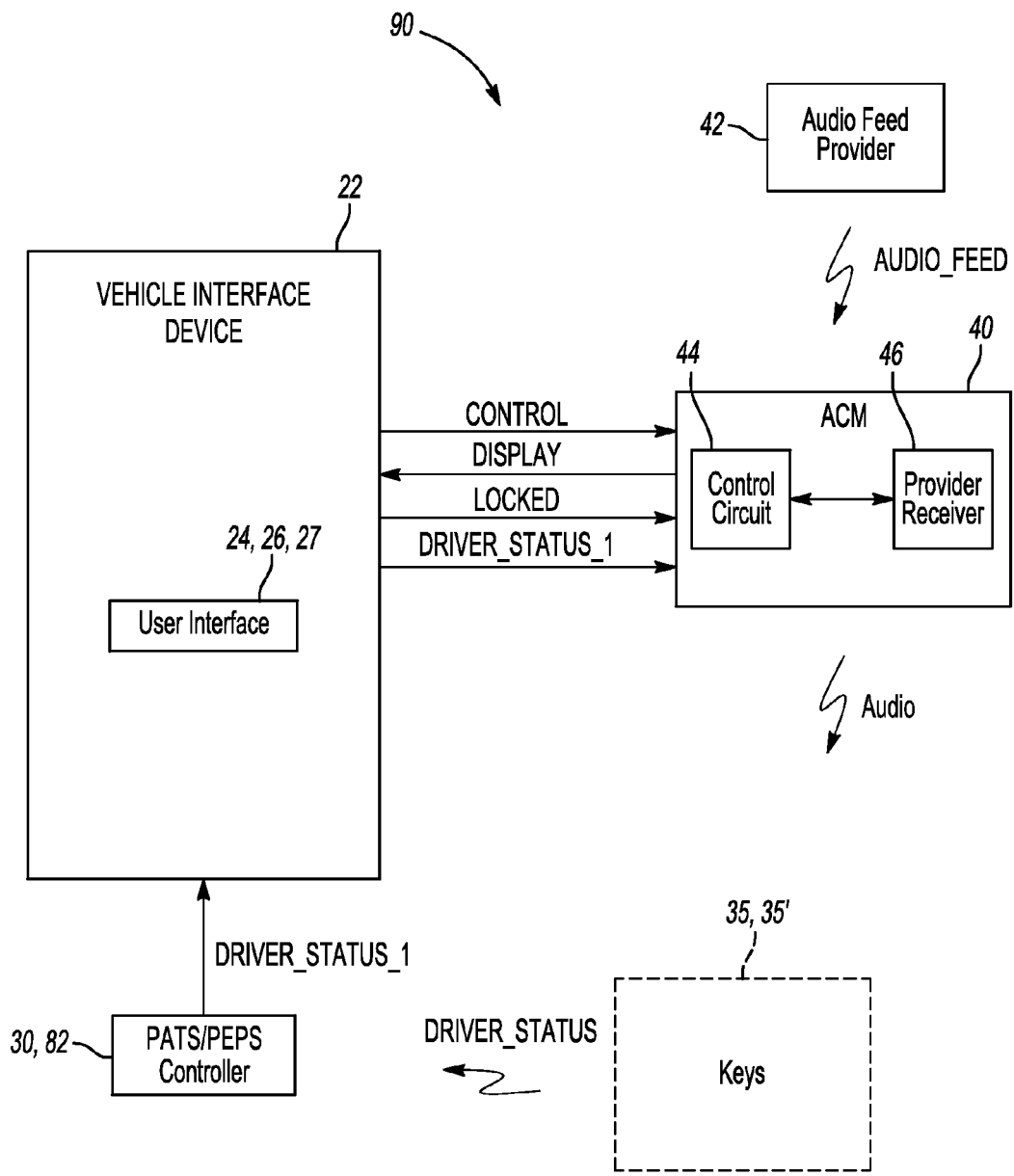
FIG. 3 depicts an audio restriction configuration that is capable of being implemented in connection with the systems of FIG. 1 or 2 for restricting audio transmission in accordance to one embodiment of the present invention.

FIG. 3 depicts an audio restriction configuration 90 that is capable of being implemented in connection with the systems 20, 70 for restricting or blocking adult content from being transmitted to the secondary driver in accordance to one embodiment of the present invention. The primary driver (once detected by the device 22 via the signal DRIVER_STATUS_1) may select either through the user interfaces 24, 26, 27 or via switches positioned directly on the ACM 40 and select particular channels that are deemed inappropriate by the primary driver to be locked out for selection by the secondary driver. The device 22 transmits a signal LOCKED that includes the selected channel(s) from the primary driver that are to be locked out for the secondary driver. The control circuit 44 co-acts with the receiver 46 to filter audio data from those channels selected by the primary driver so that the audio content is not transmitted therethrough. In one example, assuming that secondary driver is detected to be the driver of the vehicle and the secondary driver attempts to select a channel within the ACM 40 that has been locked out by the primary driver, the ACM 40 may transmit the signal DISPLAY to the device 22 so that the device 22 notifies the secondary driver that such channel is a restricted channel and that audio data associated with such channel cannot be transmitted. In another example, the locked channel may not be offered for selection to the secondary driver.

In order for the restricted audio feature to be active, the primary driver is required to have enabled the audio restriction feature. As noted above, the primary driver may toggle one or more of the user interfaces 24, 26, 27 to activate the restricted audio feature for the secondary driver. The device 22 transmits the signal CONTROL to the ACM 40 to notify the ACM 40 that the primary driver desires to enable the restricted audio feature. The ACM 40 prevents the audio data associated with the selected channels from being transmitted to the secondary driver as identified on the signal LOCKED in response to the signal CONTROL.

In yet another example, the ACM 40 may be configured to receive the signal DRIVER_STATUS_1 and enable the audio lockout feature automatically in response to the signal DRIVER_STATUS_1 indicating that the driver of the vehicle is the secondary driver. Such an aspect does not require the primary driver to have to enable the restricted audio feature via the user interfaces 24, 26, 27.

Figure 4:
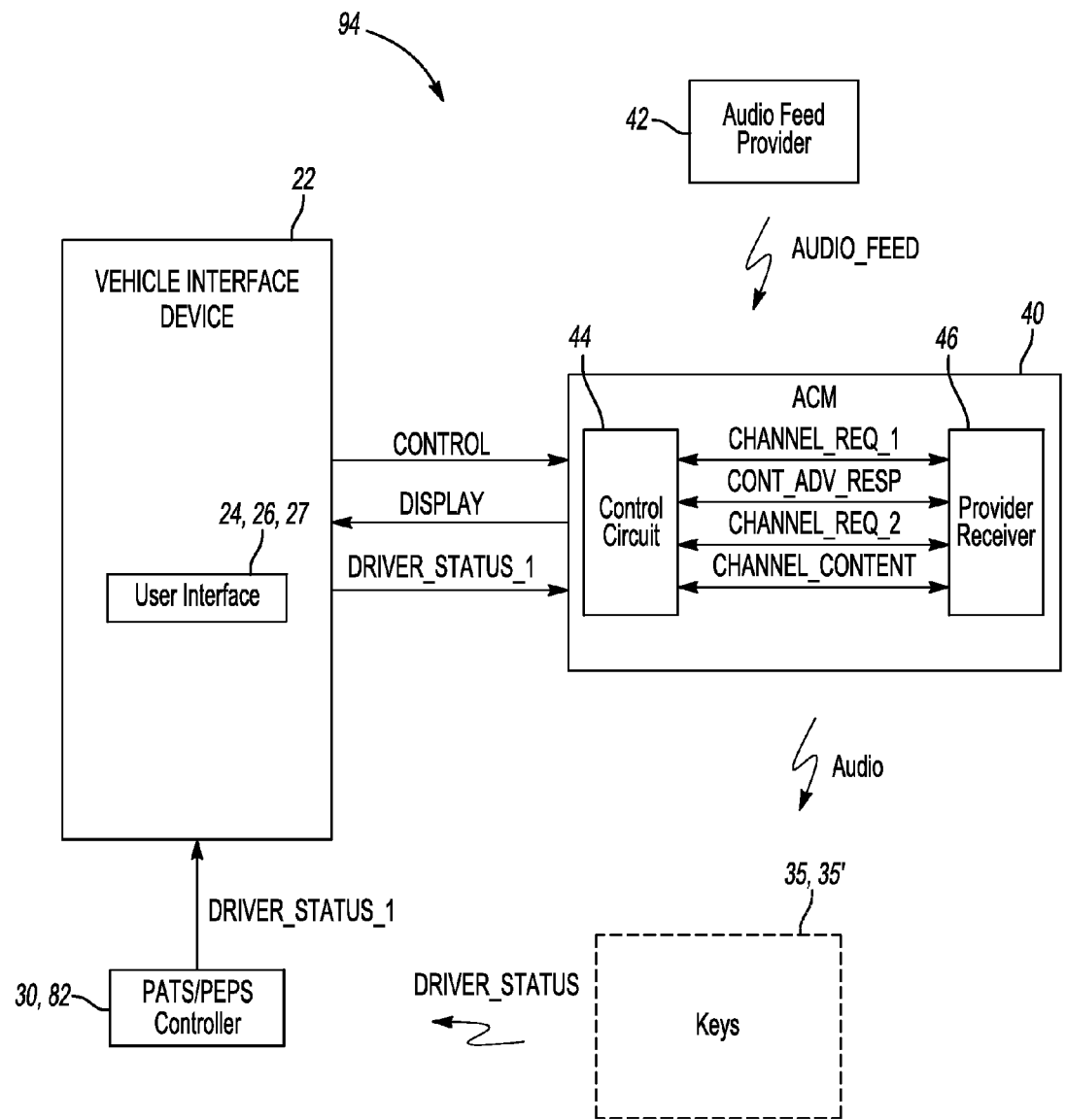
FIG. 4 depicts another audio restriction configuration that is capable of being implemented in connection with the systems of FIG. 1 or 2 for restricting audio transmission in accordance to one embodiment of the present invention.

FIG. 4 depicts an audio restriction configuration 94 that is capable of being implemented in connection with the systems 20, 70 for restricting or blocking adult content from being transmitted to the secondary driver in accordance to one embodiment of the present invention. As noted above, the control circuit 44 and the provider receiver 46 are operably coupled together via a bus. The control circuit 44 and the provider receiver 46 transmit a plurality of signals to one another via the bus. For example, in the event the driver of the vehicle is detected to be the secondary driver, and the secondary driver selects a particular channel on the ACM 40 so that an audio signal can be transmitted, the ACM 40 transmits a signal CHANNEL_REQ_1 to the provider receiver 46. The signal CHANNEL_REQ_1 corresponds to the channel that is selected by the secondary driver. The provider receiver 46 is configured to transmit a signal CONT_ADV_RESP to the control circuit 44 to assess a content advisory indicator for the selected channel. The content advisory indicator corresponds to a value that indicates the content suitability for an audience (e.g., adult based, general audience based, etc.) for that particular channel.

As noted above, the broadcast information transmitted on the signal AUDIO_FEED generally includes audio information such as, but not limited to, the channel #, title, artist, genre, advisory content information, etc.) along with the audio data (e.g., the data to be audibly consumed). The content advisory indicator includes values that are assigned to the particular channel which correspond to the content suitability of the audio data provided by that particular channel. In one example, as known with Sirius® broadcast information, the content advisory indicator may be a value between 0 and 7, where 0 corresponds to a channel that is suitable for a general audience and where 7 corresponds to a channel that exhibits explicit/crude content. The control circuit 44 may assess the content advisory indicator to determine when is it applicable to restrict the transmission of the audio data associated with a particular channel.

For example, the provider receiver 46 transmits the signal CONT_ADV_RESP in response to receiving the signal CHANNEL_REQ_1 from the control circuit 44. The signal CONT_ADV_RESP provides the content advisory indicator that is associated to the channel selected by the secondary driver. The control circuit 44 compares the value (or rating) identified on the signal CONT_ADV_RESP to a predetermined value to determine whether audio data associated to the selected channel is unsuitable for transmission to the secondary driver. In reference to the above example provided with the Sirius® broadcast information, in the event the content advisory indicator for the selected channel indicates a rating of 4 or greater, then the control circuit 44 determines audio data associated with the selected channel is unsuitable for transmission to the secondary driver. The ACM 40 prevents the transmission of the audio content for that selected channel if the value (or rating) identified on the signal CONT_ADV_RESP is greater than the predetermined value. The ACM 40 transmits the signal DISPLAY to the device 22 so that the device 22 audibly or visually transmits a message to the secondary driver indicating that the channel selected corresponds to a restricted channel. Various examples of channels that may be restricted (or locked out) include, but not limited to, Liquid Metal, Faction, Hip Hop Nation, Shade 45, Hardcore Sports Radio, Playboy Radio, Maxim Radio, Howard Stern 100 & 1001, Sirius XM Stars, Blue Collar Radio, Raw Dog Comedy, The Foxhole, Sirius OutQ, Cosmo Radio, The VIRUS, etc.

In the event the content adviser indicator indicates a rating of less than 4, the audio content associated with the selected channel is deemed suitable for transmission to the secondary driver. In such an example, the control circuit 44 transmits a signal CHANNEL_REQ_2 to the provider receiver 46 so that the provider receiver 46 proceeds in providing the audio content for the selected channel. The provider receiver 46 transmits a signal CHANNEL_CONTENT back to the control circuit 44. The signal CHANNEL_CONTENT includes decoded audio data for playback as well as the channel #, title, artist, genre, etc. The ACM 40 transmits such data on the signal DISPLAY to the device 22. The device 22 audibly/visually displays such data therefrom to the secondary driver. The ACM 40 enables the audio data associated with the selected channel to be transmitted to the secondary driver.

It is contemplated that the ACM 40 may be configured to automatically enable the restricted audio feature in response to the signal DRIVER_STATUS_1 indicating that the driver of the vehicle is the secondary driver as noted above. For example, the primary driver cannot configure the audio lock out feature as desired and the feature is automatically turned on once the driver is detected to be the secondary driver. In yet another example, the primary driver may enable the restricted audio feature as desired via the user interfaces 24, 26, 27 on the device 22. The device 22 transmits the signal CONTROL to the ACM 40 which indicates whether the restricted audio feature is enabled.

Figure 5:
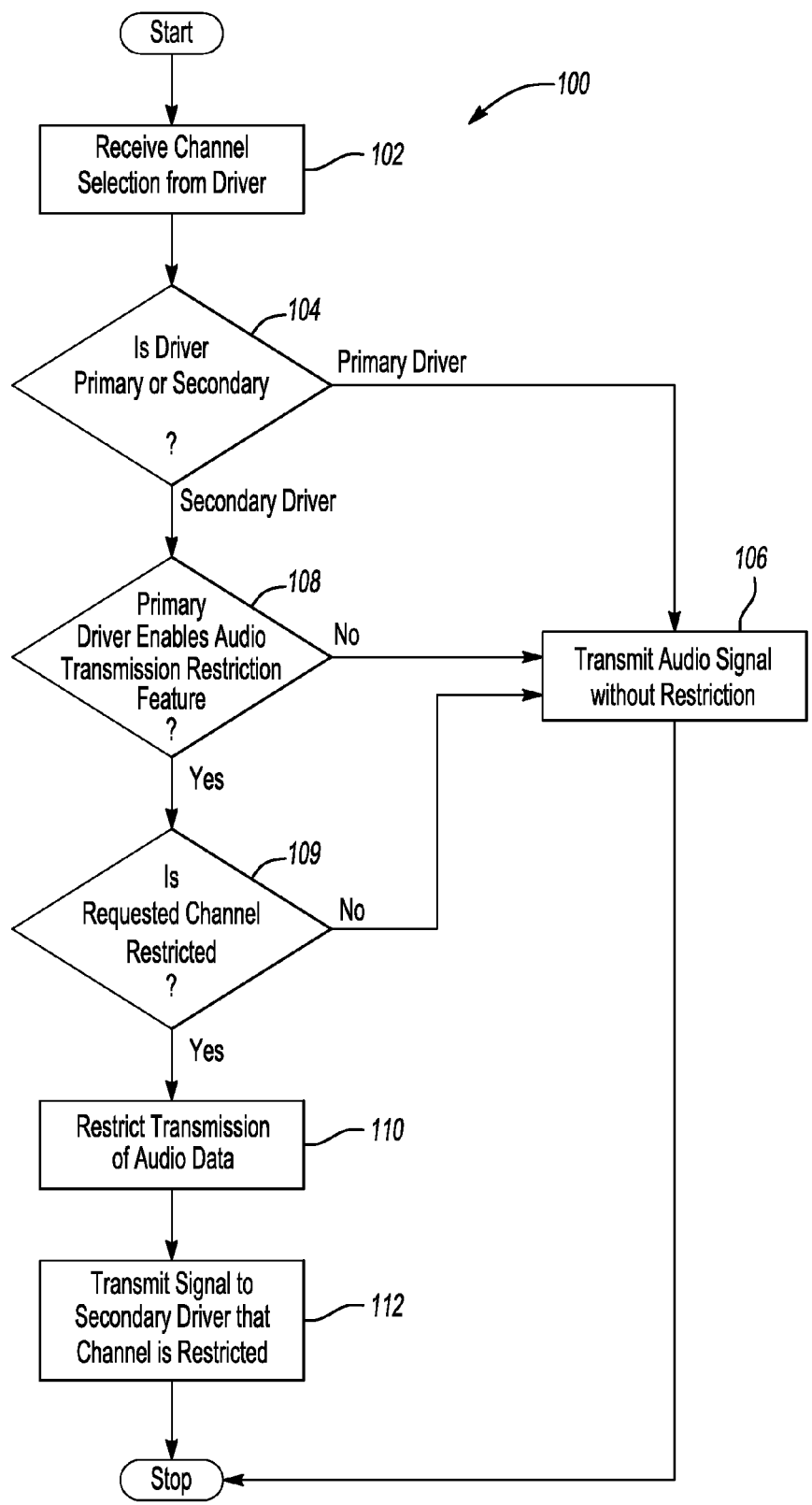
FIG. 5 depicts a method for restricting audio transmission based on driver status in accordance to one embodiment of the present invention.

FIG. 5 depicts a method 100 for restricting audio transmission based on driver status in accordance to one embodiment of the present invention. The particular order of the operations in the method 100 when performed can be in any order and are not to be limited to only being performed sequentially. The order of the operations may be modified and vary based on the desired criteria of a particular implementation.

In operation 102, the ACM 40 receives a command to switch to a channel in response to driver input.

In operation 104, the ACM 40 determines whether the driver of the vehicle is the primary driver or the secondary driver. If the driver is detected to be the primary driver, then the method 100 moves to operation 106. If the driver is detected be the secondary driver, then the method 100 moves to operation 108.

In operation 106, the ACM 40 enables the primary driver to select the desired channel for transmitting the desired audio signal.

In operation 108, the ACM 108 determines whether the primary driver has enabled the restricted audio transmission feature for the secondary driver. As noted above, this operation is optional. For example, it is contemplated that the ACM 40 may automatically enable the restricted audio transmission feature (e.g., without primary driver input) in response to determining that the driver of the vehicle is the secondary driver. The particular implementation with respect to whether the ACM 40 automatically enables the restricted audio transmission feature or waits for the primary driver to select the restricted audio transmission feature varies based on the desired criteria of a particular implementation.

If the implementation requires that the primary driver turn on the restricted audio transmission feature for the secondary driver and the primary driver has not selected the restricted audio transmission feature for the secondary driver, then the method 100 moves to operation 106. If the primary driver has selected (or turned on) the restricted audio transmission feature for the secondary driver, then the method 100 moves to operation 109.

In operation 109, the ACM 40 determines whether the requested channel is a restricted channel. In one example, the ACM 40 may receive the signal LOCKED from the device 22 which is indicative of one or more channels selected by the primary driver that may be unsuitable for the secondary driver. In another example, the ACM 40 assesses the content advisory indicator transmitted on the signal AUDIO_FEED to assess if the content of the audio data associated with the selected channel is unsuitable(e.g., compares the content advisory indicator to the predetermined threshold). If the requested channel provides audio that is unsuitable, then the method moves to operation 110. If the requested channel provides audio that is suitable, then the method moves back to operation 106.

In operation 110, the ACM 40 restricts audio transmission for the secondary driver.

In operation 112, the ACM 40 transmits the signal DISPLAY to the device 22 to indicate that the channel is restricted.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An apparatus for restricting audio transmission in a vehicle, the apparatus comprising:
a control module configured to:
receive a driver status signal from an ignition key device that is indicative of a driver being one of a primary driver and a secondary driver, the ignition key device for enabling access to the vehicle;
receive a first command from the primary driver to receive, at any one of a plurality of channels, an audio feed signal including audio content for playback;
receive a second command from the primary driver to lock a first channel from the plurality of channels such that audio content is prevented from being played back for the secondary driver; and;
prevent the first channel from being displayed for selection by the secondary driver based on the second command in response to subsequently receiving the driver status signal indicating that the driver of the vehicle is the secondary driver.

2. The apparatus of claim 1 wherein the control module is operably coupled to a display that provides the first command and the second command from the primary driver.

3. The apparatus of claim 1 wherein the ignition key device is a transponder that transmits the driver status signal.

4. The apparatus of claim 1 wherein the audio feed signal further includes a channel number, song title, artist, and music genre.

5. The apparatus of claim 1 wherein the control module is positioned in the vehicle.

6. The apparatus of claim 1 wherein the control module is further configured to enable one or more second channels from the plurality of channels to be selected by the secondary driver in response to subsequently receiving the driver status signal indicating that the driver of the vehicle is the secondary driver.

7. A method for restricting audio transmission in a vehicle, the method comprising:
receiving a driver status signal from an ignition key device that is indicative of a driver being one of a primary driver and a secondary driver, the ignition key device for enabling access to the vehicle;
receiving a first command from the primary driver to receive, at any one of a plurality of channels, an audio feed signal including audio content for playback;
receiving a second command from the primary driver to lock a first channel from the plurality of channels such that audio content is prevented from being played back for the secondary driver; and
preventing the first channel from being displayed for selection by the secondary driver based on the second command in response to subsequently receiving the driver status signal indicating that the driver of the vehicle is the secondary driver.

8. The method of claim 7 further comprising transmitting from a display, the first command and the second command from the primary driver prior to receiving the first command.

9. The method of claim 7 further comprising wirelessly transmitting the driver status signal from the ignition key device prior to receiving the driver status signal.

10. The method of claim 9 wherein wirelessly transmitting the driver status signal further comprises wirelessly transmitting the driver status signal as a radio frequency based signal.

11. The method of claim 7 wherein the audio feed signal further includes a channel number, song title, artist, and music genre.

12. The method of claim 7 further comprising enabling one or more second channels from the plurality of channels to be selected by the secondary driver in response to subsequently receiving the driver status signal indicating that the driver of the vehicle is the secondary driver.

13. An apparatus comprising:
a control module configured to:
- receive a driver status signal indicative of a driver being one of a primary driver and a secondary driver;
- receive a first command from the primary driver to lock a first channel from a plurality of channels such that audio content therein is prevented from being played back for the secondary driver; and
- prevent the first channel from being displayed for selection by the secondary driver based on the first command.

14. The apparatus of claim 13 wherein the control module is further configured to prevent the first channel from being displayed for selection by the secondary driver based on the first command and in response to subsequently receiving the driver status signal indicating that the driver is the secondary driver.

15. The apparatus of claim 13 wherein the control module is operably coupled to a display that provides the first command from the primary driver.

16. The apparatus of claim 13 further comprising an ignition key device that is a transponder that transmits the driver status signal.

17. The apparatus of claim 13 wherein the audio feed signal further includes a channel number, song title, artist, and music genre.

18. The apparatus of claim 13 wherein the control module is positioned in the vehicle.

19. The apparatus of claim 13 wherein the control module is further configured to enable one or more second channels from the plurality of channels to be selected by the secondary driver.

* * * * *